(12) United States Patent
Ament

(10) Patent No.: US 7,040,084 B2
(45) Date of Patent: May 9, 2006

(54) EXHAUST EMISSION AFTERTREATMENT

(75) Inventor: Frank Ament, Troy, MI (US)

(73) Assignee: General Motors Corporation, Detroit, MI (US)

( * ) Notice: Subject to any disclaimer, the term of this patent is extended or adjusted under 35 U.S.C. 154(b) by 53 days.

(21) Appl. No.: 10/735,599

(22) Filed: Dec. 12, 2003

(65) Prior Publication Data
US 2004/0144083 A1 Jul. 29, 2004

Related U.S. Application Data

(60) Provisional application No. 60/433,758, filed on Dec. 16, 2002.

(51) Int. Cl.
*F01N 3/00* (2006.01)

(52) U.S. Cl. .............................. 60/274; 60/286; 60/295; 60/303; 422/182; 422/183; 48/197 R

(58) Field of Classification Search .................. 60/274, 60/286, 295, 301, 303; 48/197 R; 422/177, 422/182, 183
See application file for complete search history.

(56) References Cited

U.S. PATENT DOCUMENTS

| | | | | |
|---|---|---|---|---|
| 5,586,433 | A * | 12/1996 | Boegner et al. | 60/274 |
| 6,176,078 | B1 * | 1/2001 | Balko et al. | 60/274 |
| 6,739,125 | B1 * | 5/2004 | Mulligan | 60/286 |
| 6,832,473 | B1 * | 12/2004 | Kupe et al. | 60/286 |
| 6,843,054 | B1 * | 1/2005 | Taylor et al. | 60/275 |
| 6,845,610 | B1 * | 1/2005 | Shiino et al. | 60/286 |

* cited by examiner

*Primary Examiner*—Binh Q. Tran
(74) *Attorney, Agent, or Firm*—Christopher DeVries

(57) ABSTRACT

An engine control system in a vehicle including a diesel engine in the vehicle, a diesel fuel tank for supplying fuel to the diesel engine, a gasoline tank in the vehicle, a reformer for providing partial oxidation products from gasoline contained in the gasoline tank, a NOx trap coupled to the exhaust of the diesel engine.

9 Claims, 3 Drawing Sheets

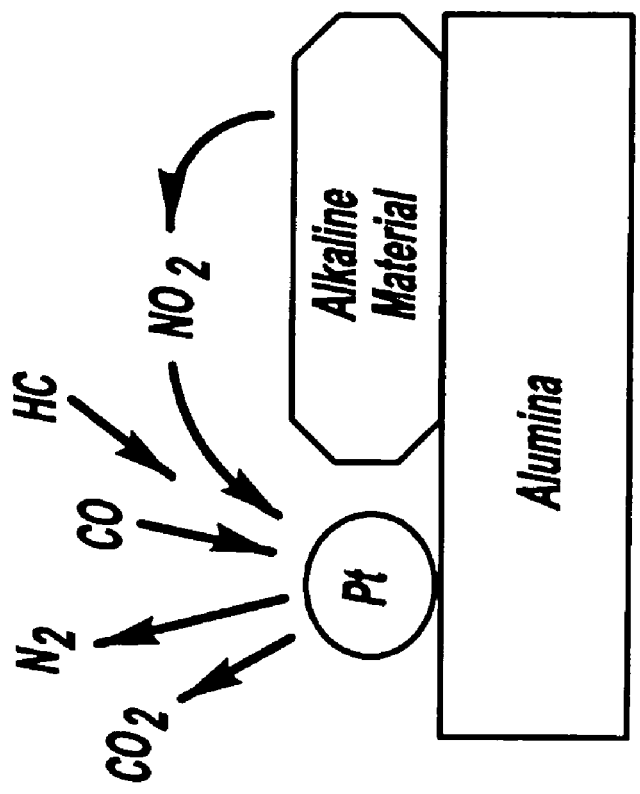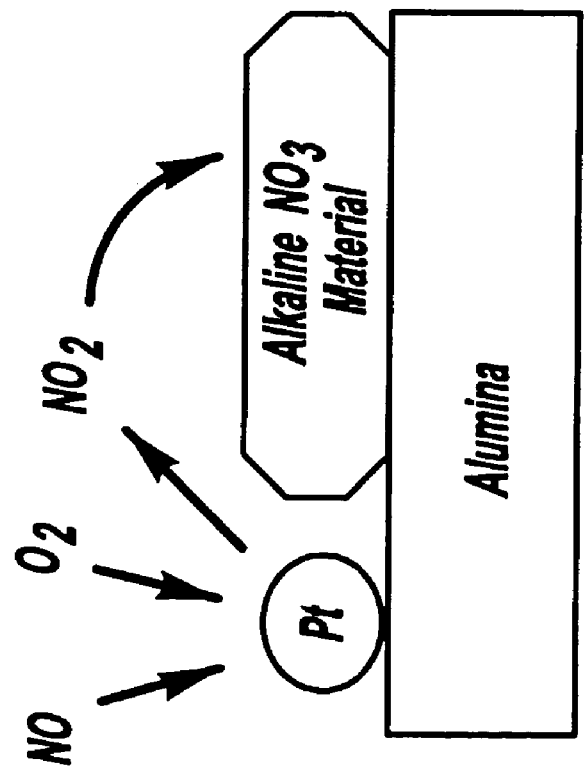
FIG-2

EXHAUST EMISSION AFTERTREATMENT

CROSS-REFERENCES TO RELATED APPLICATIONS

This application claims the benefit of U.S. Provisional Application No. 60/433,758, filed Dec. 16, 2002.

TECHNICAL FIELD

The present invention relates to the control of internal combustion engines. More specifically, the present invention relates to a method and apparatus to control a diesel engine to improve catalytic efficiency.

BACKGROUND OF THE INVENTION

Present regulatory conditions in the automotive market have led to an increasing demand to reduce emissions in present vehicles. Catalytic converters and NOx traps or absorption units are among the primary tools used to reduce emissions in vehicles.

A three-way catalytic converter oxidizes hydrocarbons (HC) and carbon monoxide (CO) emissions in a vehicle into relatively benign compounds such as carbon dioxide ($CO_2$) and water. A catalytic converter typically includes a specific catalyst formulation including platinum, palladium, and rhodium to reduce oxides of nitrogen (NOx), HC and CO simultaneously. The conversion efficiency of a catalyst depends on the temperature of the catalyst and the air/fuel ratio. NOx traps are used to capture NOx during lean operating conditions and release NOx under rich operating conditions, such that the NOx is reduced to carbon dioxide and nitrogen ($N_2$)

The functional temperature range for a typical lean NOx trapping and three-way conversion catalyst is shown in FIG. 1. As shown in this example, peak NOx conversion efficiency is obtained in substantially the 250° C.–450° C. temperature range. These temperatures may vary somewhat based on the specific formulation of precious metals and NOx trapping chemicals. These temperatures are high enough to simultaneously clean up the HC and CO emissions. The catalyst formulation shown in FIG. 2 effectively traps NOx during lean air-fuel operation by catalyzing NO to $NO_2$, and then chemically storing it as a nitrate ($NO_3$) compound on the washcoat surface. When all the NOx storage sites are filled, a reducing (oxygen deficient, CO rich) exhaust environment must be created in the catalytic converter. The reducing environment causes the stored nitrate ($NO_3$) to be released as gaseous $NO_2$. The $NO_2$ can be further reduced to nitrogen, $N_2$, at a precious metal site, such as platinum, if sufficient reductants such as HC, CO and $H_2$ are present.

The typical precious metal catalyst formulations maintain very high conversion efficiencies up to temperatures of 900° C. The NOx storage compounds, such as barium or potassium, that are added to the three-way catalysts are usually stable up to temperatures of approximately 850° C.

Lean NOx trap performance on diesel engine applications is severely limited by the lower exhaust gas temperatures and the difficulty of providing frequent, rich exhaust mixtures to the catalyst. (Lean and rich air-fuel ratios are described in the next paragraph) The diesel engine's very low exhaust temperatures are the result of very lean operation, and higher compression and expansion ratios. These are the same attributes that account for the higher fuel efficiency compared to the spark ignited gasoline engine.

Air-fuel ratios may also be adjusted to vary catalytic performance in a vehicle. An air-fuel mixture is represented by a ratio called the equivalence ratio that is represented by the symbol $\lambda$.

The equivalence ratio is defined by the following equation:

$$\lambda = \frac{\text{(air/fuel)}}{\text{(air/fuel stoichiometry)}}$$

A relatively low air/fuel ratio below 14.7 ($\lambda<1$) is characterized as a rich mixture, and an air fuel ratio above 14.7 ($\lambda>1$) can be characterized as a lean mixture. Traditional vehicle gasoline engines are operated at stoichiometry ($\lambda=1$) since most regulated exhaust gases can be reduced simultaneously at stoichiometry. If vehicle engines are operated on lean mixtures, such as diesel engines, the NOx compounds generated may not be sufficiently reduced by traditional three-way catalysis. Therefore, these engines have difficulty meeting the increasingly stringent exhaust emissions regulations.

Present systems to improve NOx emissions for diesel-powered vehicles include urea selective catalytic reduction (SCR) and lean NOx trap systems. Urea SCR utilizes a urea supply (($NH_2)_2$ CO) and exhaust dosing system to provide ammonia ($NH_3$) to the feedstream of a large, specialized catalyst. The ammonia then reduces the NOx emissions to $N_2$ over the selective catalyst. Urea SCR requires a separate urea tank in a vehicle and the development of a urea fueling infrastructure. The Lean NOx Trap system further requires a specially formulated three-way catalyst with added NOx storage chemistry. The NOx emissions that are chemically stored during lean operation must be released and reduced in a net, fuel-rich environment on the catalyst surface. The frequent generation of rich, reducing exhaust pulses poses significant challenges to diesel engine systems.

SUMMARY OF THE INVENTION

The present invention is a method and apparatus for supplying an on-board reductant system for diesel aftertreatment. The present invention utilizes gasoline to generate the onboard exhaust reductant for diesel engine exhaust NOx reduction. In alternate embodiments gasoline/alcohol blends may also be used. Since gasoline is readily available at fueling stations, it is can be supplied while the diesel fuel tank is filled. Gasoline also vaporizes more easily and burns more cleanly than diesel fuel, making it an attractive fuel for generating on-board reductants. A separate gasoline tank and gasoline reformer is included in the present invention to generate rich combustion products; including hydrogen, carbon monoxide, and nitrogen which can be used to purge and reduce the NOx emissions that are stored in the NOx trap. The frequency of NOx trap regeneration is calibrated as a function of the storage capacity of the NOx trap.

BRIEF DESCRIPTION OF THE DRAWINGS

FIG. 2 is a diagrammatic drawing of a NOx trap used in present invention; and

DESCRIPTION OF THE PREFERRED EMBODIMENT

FIG. 2 is a functional diagram of a NOx trap 18 utilizing metal oxides (MeO) as a trapping agent for NOx compounds during lean operating conditions and releasing NOx compounds during rich conditions. The reductant carbon monoxide and hydrocarbons in the relatively rich exhaust stream combine with the released NOx and convert it to nitrogen and oxygen.

Figure 1:
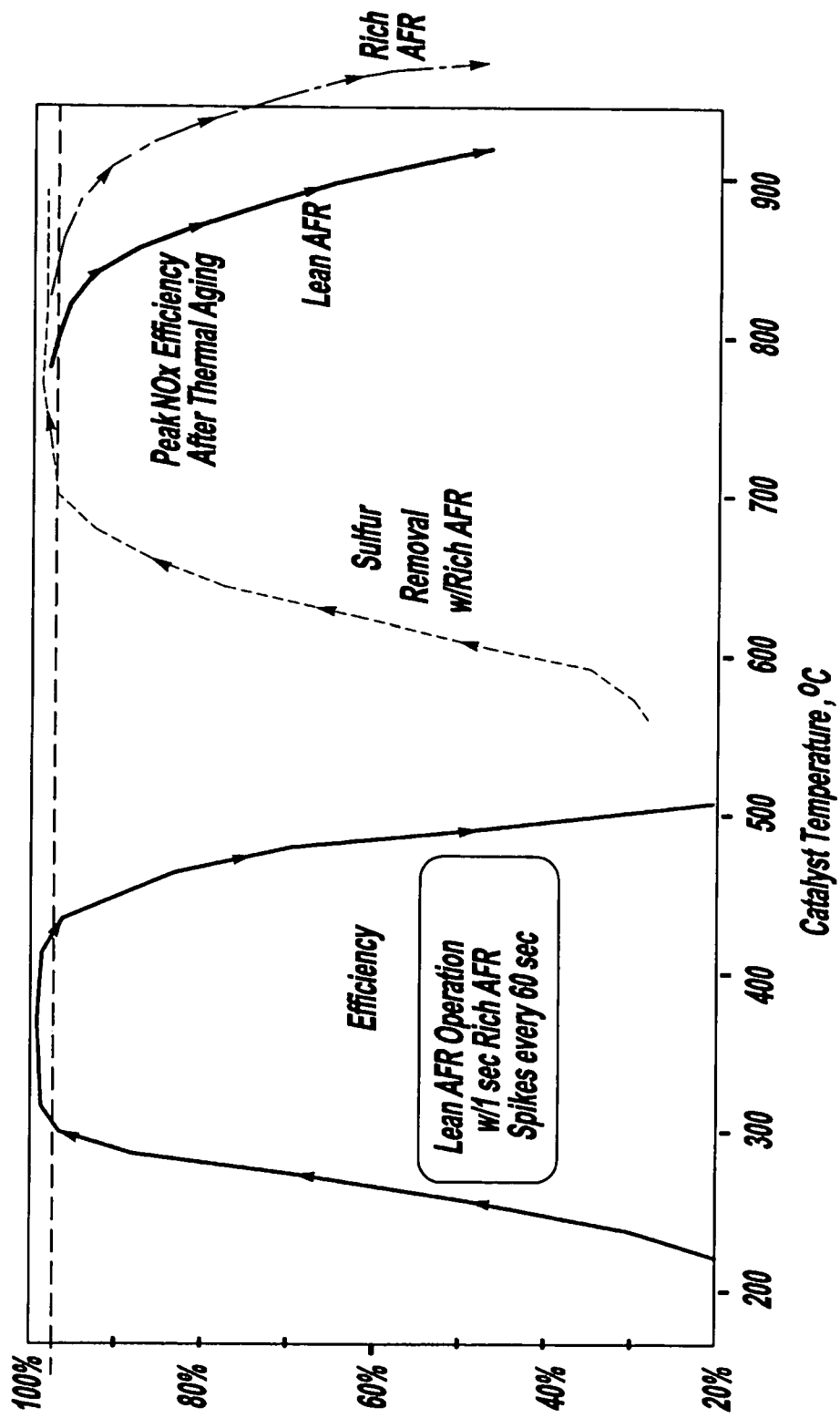
FIG. 1 is a plot of the thermal NOx conversion efficiency of a NOx trap.
Figure 3:
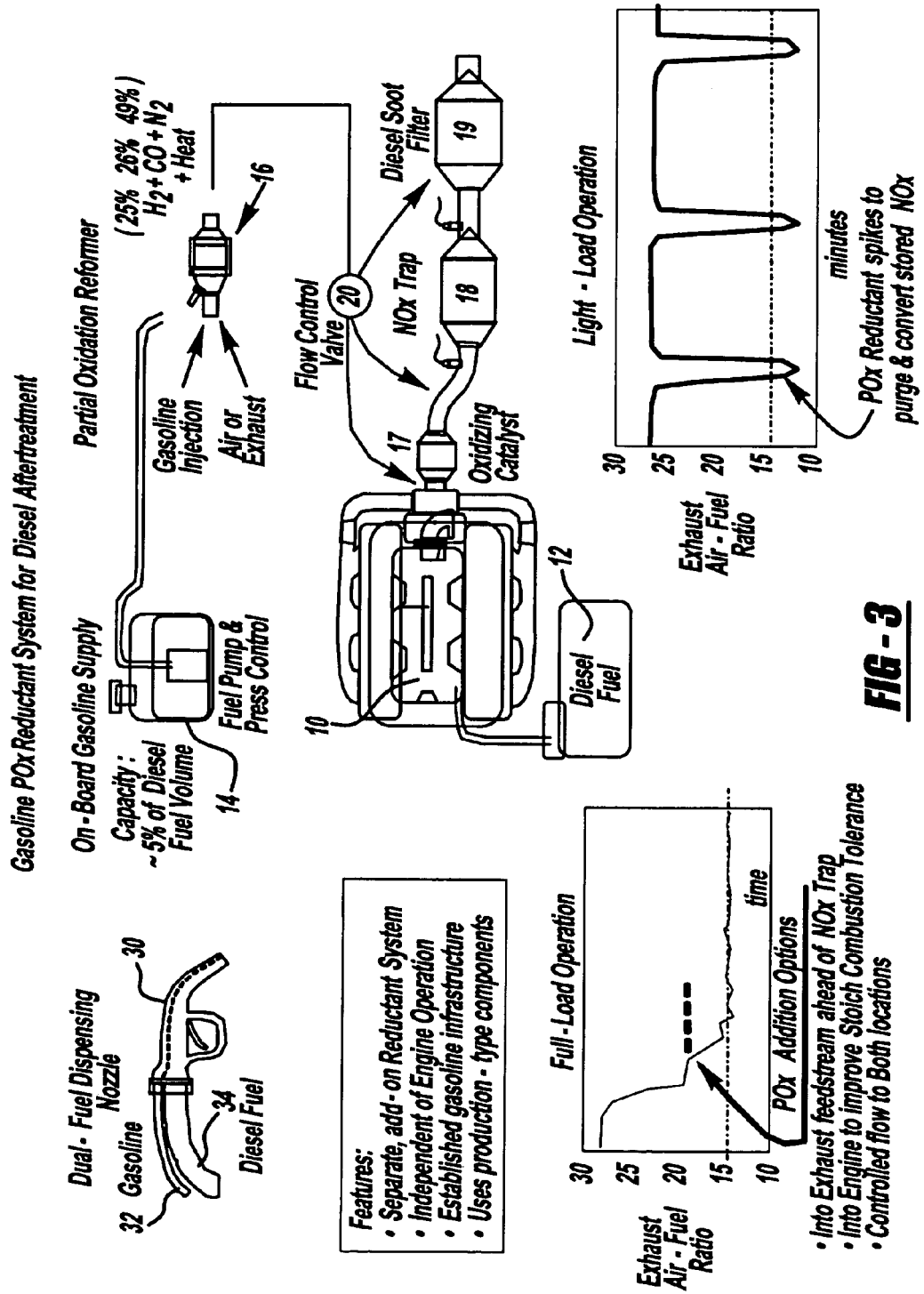
FIG. 3 is a diagrammatic drawing of the system of the present invention.

FIG. 3 is a diagrammatic drawing of the present invention including a diesel engine 10, a diesel fuel tank 12, a gasoline tank 14, a partial oxidation (POx) reformer 16, and a NOx trap 18. During the lean operating modes of the diesel engine, the NOx trap 18 will become saturated with NOx. At precalibrated or during certain engine operating modes, the reformer 16 will provide partial oxidation products such as hydrogen, carbon monoxide and nitrogen to regenerate the NOx trap 18. The reformer 16 may be comprised of an air supply, a fuel spray and vaporization stage, an ignition source, and a catalyst to reduce the hydrocarbon fuel to $H_2$ and CO. The terms reformate or reductancts will be defined as $H_2$, CO, and hydrocarbons (HC) and any combination of $H_2$, CO and HC's. The catalyst could be a conventional, monolith substrate with a washcoat containing rhodium (Rh).

The reformer air can be supplied by a blower fed with inlet air or hot, lean engine exhaust. With turbocharged engines, the higher pressure air can also be supplied from the inlet compressor stage. The POx reformer 16 is preferably operated with air-fuel ratios less than 0.5 of stoichiometry. In practice, the maximum H2 and CO yield is achieved at Oxygen to Carbon mole ratios slightly greater than 1.0 (this corresponds to an A/F Ratio of substantially 5 to 1 for gasoline). Reformers rely on vaporized fuel being injected onto an active catalyst 17 surface. Since the distillation temperature for gasoline is much lower than for diesel fuel, the fuel injection system can be greatly simplified compared to a diesel fuel reformer. The heating requirement for the vaporization stage ahead of the catalyst 17 can also be smaller and require less power with gasoline. Depending on how the reformer is integrated into the engine/exhaust system, much of the heat may be supplied by the exhaust gases.

As shown in FIG. 3, the reformer 16 produces a significant amount of heat (along with the reformate products) which can be used to raise the operating temperature of the exhaust emissions after-treatment components. When the diesel engine 10 is operating most efficiently, the exhaust temperatures are typically too low for optimum catalytic conversion. Without a supplemental heat source, the general practice is to de-optimize the engine combustion to increase the exhaust temperatures. With the present reformer system, the engine combustion can remain optimized and the reformate flow can be used to control the temperature of the lean NOx trap and other thermally activated devices such as the diesel soot filter 19. In addition to the reformer 16 exhaust heat, the partial oxidation of CO, $H_2$ and HC can be leveraged to provide additional heat to increase the chemical reaction efficiency in the NOx trap 18, and the diesel soot filter 19.

In the preferred embodiment of the present invention shown in FIG. 3, a flow control valve 20 will control the flow of partial oxidation products to the engine 10 and the NOx trap 18. The reformate flow can be proportioned between the engine 10 and the NOx trap 18 depending on the engine operating conditions and the regeneration requirements of the NOx trap 18. For most turbocharged engines, the reformate is most easily delivered through an exhaust gas recirculation system. The reformate may also be fed into the engine inlet air stream as required by the combustion system designers. The reformate delivery point and quantity can be selected based on the operating conditions and the aftertreatment requirements of the specific engine application by controlling flow control valve 20.

In an alternate embodiment of the present invention, the flow control valve 20 will control the flow of partial oxidation products to the exhaust aftertreatment devices such as the oxidizing catalyst 17, the NOx trap 18, and a diesel soot filter 19. This alternate embodiment focuses on controlling the temperature and reformate flow to optimize the performance of the NOx trap 18.

At light to moderate engine loads, the exhaust air-fuel ratio is relatively lean, and the NOx trap 18 temperature falls below the effective storage temperature. The reformate can be delivered to the oxidizing catalyst 17 inlet to help heat the NOx trap 18, while maintaining an overall lean exhaust air-fuel ratio. A relatively low flow of reformate can be added to the oxidizing catalyst 17 over a prolonged period of time. The resulting exotherm provides "buffered" heating of the temperature sensitive NOx trap 18 and maintains its relatively large volume at the optimum storage temperature. By adding the reformate to the upstream oxidizing catalyst 17, the NOx trap 18 is not subjected to the localized, exothermic temperature spikes from oxidizing the high energy reformate products. The localized temperature spikes may result in thermal aging of the NOx absorbing materials, or result in stored NOx emissions being released while the bulk trap temperature is still too low for complete reduction to N2.

At higher engine loads, the exhaust air-fuel ratio can be much richer (as rich as 15% lean of stoichiometry) and the exhaust temperatures can exceed the NOx trap 18 storage temperature. Under these conditions, the reformate may be added ahead of the NOx trap 18 to provide a net rich exhaust air-fuel ratio pulses to regenerate the NOx trap 18. The combination of higher temperatures and rich exhaust in the NOx trap 18 results in the stored NOx being released from the surface and reduced to N2 in the gas phase.

The high temperature engine operating modes also provide an opportunity to purge the stored Sulfur from the NOx trap 18. The reformer system can supply the prolonged rich air-fuel mixture and higher temperatures that are required for Sulfur regeneration of a NOx trap 18. Unlike the lower temperature limitations of the NOx trap 18, the reformate can be fed directly to a diesel soot filter 19 to generate exothermic heat release to initiate and maintain soot regeneration.

The flow control valve 20, engine 10 and other engine controls are electronically controlled by a powertrain control module (PCM). As previously described and seen in FIG. 3, the flow control valve may direct reformate to any point in the engine and the exhaust stream singly or in combination. Because the POx reformer 16 is independent of the diesel engine 10 operating mode, it can be operated at various flow rates to supply reformate to the engine and, or the exhaust aftertreatment components. This allows NOx emissions optimization in the combustion chamber, in the NOx trap, or both simultaneously, depending on the engine operating.

The present invention further includes a dual-fuel dispensing device 30. The device 30 includes a gasoline nozzle 32 and diesel engine nozzle 34. The gasoline nozzle 32 will fill the gasoline tank 14 and the diesel nozzle 34 will fill the diesel tank 12. While the estimated gasoline volume will be around 5% of the diesel fuel volume, the gasoline fill rate may be set high enough to ensure complete fill of the gasoline tank, even at partial diesel fuel fills. This would ensure sufficient POx availability for NOx emissions control. The dual fuel dispensing device may be incorporated into the filling infrastructure of a filling station, as gasoline and diesel fuel are presently available at most filling stations. While not described in detail here, it is understood that the reformate controls can be optimized by using a wide range of available diesel exhaust sensors such as: wide range air-fuel, NOx and temperature sensors.

Furthermore, while this invention has been described in terms of some specific embodiments, it will be appreciated that other forms can readily be adapted by one skilled in the art. Accordingly, the scope of this invention is to be considered limited only by the following claims.

The invention claimed is:

1. An engine control system in a vehicle comprising:
    a diesel engine in the vehicle;
    a diesel fuel tank for supplying fuel to the diesel engine;
    a gasoline tank in the vehicle;
    a reformer for providing partial oxidation products from gasoline contained in said gasoline tank;
    a NOx trap coupled to the exhaust of said diesel engine.

2. The engine control system of claim 1 wherein said NOx trap includes a three-way catalyst.

3. The engine control system of claim 1 wherein said NOx trap is regenerated by said partial oxidation products.

4. The engine control system of claim 1 wherein said partial oxidation products include carbon monoxide, hydrogen, or nitrogen.

5. A method of controlling a diesel engine comprising:
    providing a diesel fuel tank;
    providing a gasoline fuel tank;
    providing a gasoline reformer;
    providing a NOx trap;
    generating partial oxidation products using said gasoline reformer; and
    regenerating said NOx trap with said partial oxidation products.

6. A method of controlling a diesel engine comprising:
    supplying gasoline to a partial oxidation reformer to generate reformate; and
    introducing the reformate into the diesel engine.

7. The method of claim 6 where in the reformate comprises hydrogen.

8. The method of claim 6 wherein the reformate comprises carbon monoxide.

9. The method of claim 6 wherein the reformate comprises hydrocarbons.

* * * * *